(12) United States Patent
Han

(10) Patent No.: US 9,323,361 B2
(45) Date of Patent: Apr. 26, 2016

(54) INTEGRATED TOUCH SCREEN

(75) Inventor: Jae Heung Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 210 days.

(21) Appl. No.: 13/493,221

(22) Filed: Jun. 11, 2012

(65) Prior Publication Data

US 2012/0313877 A1 Dec. 13, 2012

(30) Foreign Application Priority Data

Jun. 13, 2011 (KR) .................. 10-2011-0056804

(51) Int. Cl.
G09G 3/36 (2006.01)
G06F 3/041 (2006.01)
G06F 3/044 (2006.01)
G02F 1/1333 (2006.01)

(52) U.S. Cl.
CPC ............ *G06F 3/041* (2013.01); *G02F 1/13338* (2013.01); *G06F 3/044* (2013.01); *G02F 2001/133302* (2013.01)

(58) Field of Classification Search
CPC .......... G09G 3/36; G06F 3/041; G06F 3/045; G06F 3/044; C03C 21/00; B32B 37/14; G02F 2001/133302; G02F 1/13338
USPC ..................... 345/174, 173; 216/17
See application file for complete search history.

(56) References Cited

U.S. PATENT DOCUMENTS

| 6,259,491 | B1 * | 7/2001 | Ekedahl et al. ................. 349/23 |
| 7,663,607 | B2 * | 2/2010 | Hotelling et al. ............. 345/173 |
| 8,568,600 | B2 * | 10/2013 | Kang et al. ..................... 216/17 |
| 8,797,285 | B2 * | 8/2014 | Guard et al. .................. 345/173 |
| 2005/0231487 | A1 * | 10/2005 | Ming ............................ 345/173 |
| 2006/0097991 | A1 * | 5/2006 | Hotelling ............. G06F 3/0416 345/173 |
| 2010/0123680 | A1 * | 5/2010 | Lee et al. ...................... 345/174 |
| 2010/0134448 | A1 | 6/2010 | Park et al. |
| 2010/0182274 | A1 * | 7/2010 | Kang ..................... G06F 3/045 345/174 |
| 2011/0007011 | A1 * | 1/2011 | Mozdzyn ..................... 345/173 |
| 2011/0102346 | A1 * | 5/2011 | Orsley et al. ................. 345/173 |
| 2011/0134056 | A1 * | 6/2011 | Kim et al. ..................... 345/173 |
| 2011/0187666 | A1 * | 8/2011 | Min ....................... G06F 3/041 345/173 |
| 2011/0221699 | A1 * | 9/2011 | Kim ............................. 345/174 |
| 2011/0291966 | A1 * | 12/2011 | Takao et al. .................. 345/173 |
| 2012/0262382 | A1 * | 10/2012 | Guard .................... G06F 3/044 345/173 |

FOREIGN PATENT DOCUMENTS

KR 10-2010-0063263 A 6/2010
KR 10-0997712 B1 12/2010

* cited by examiner

*Primary Examiner* — Aneeta Yodichkas
*Assistant Examiner* — Chineyere Wills-Burns
(74) *Attorney, Agent, or Firm* — Saliwanchik, Lloyd & Eisenschenk

(57) ABSTRACT

Disclosed is a structure of a touch screen which is integrally implemented with a liquid crystal panel. In the structure, a touch sensor module is integrally implemented with the liquid crystal panel, a substrate of the liquid crystal panel is formed of two side strengthened glass, and the touch sensor module is integrally implemented on the two strengthened glass, thereby being capable of improving strength of the whole touch sensor module and simplifying a process.

10 Claims, 5 Drawing Sheets

INTEGRATED TOUCH SCREEN

CROSS-REFERENCE TO RELATED APPLICATION

This application claims the benefit under 35 U.S.C. §119 of Korean Patent Application No. 10-2011-0056804, filed Jun. 13, 2011, which is hereby incorporated by reference in its entirety.

BACKGROUND

1. Field of the Invention

The present invention relates to a structure of a touch screen which is integrally implemented with a liquid crystal panel.

2. Description of the Related Arts

A touch screen panel is an input unit which is able to input a user's instruction by selecting an instruction content displayed in a screen of an image display unit using the human hand or an object.

For this, the touch screen panel is installed on a front surface of the image display unit to thereby convert a touch position touched directly to the human hand or the object to an electric signal. Accordingly, the instruction content selected from the touch position is received as an input signal.

Such a touch screen panel may replace a separate input unit which is operably connected to the image display unit like a keyboard and a mouse, and thus the use range thereof has been gradually increasing.

However, when the touch screen panel is attached to an upper part of a panel of the image display unit, a whole volume of the image display unit increases, so a problem such as the degradation in convenience to carry out may occur. Accordingly, the development of a thin touch screen panel has been recently required.

However, in the case of a general touch screen panel, to improve apparatus strength, a window is additionally installed on an upper surface of the touch screen panel. Thus, this is disadvantageous that the touch screen panel increases in thickness, thereby going counter to the trend toward a thinner touch screen panel. Furthermore, the window may be generally implemented as a strengthened glass substrate, but to use the strengthened glass substrate as the window, after cutting the glass substrate into cell units, a process for strengthening individually the cell units should be carried out. The production of the touch screen panel using the window of each cell unit is disadvantageous that mass production cannot be secured.

That is, like a structure illustrated in FIG. 1, in a conventional touch screen panel having an integrated liquid crystal panel, a touch screen panel TSP bonded onto an upper part of the liquid crystal panel L is disposed, and the touch screen panel is implemented in a sequential stacked structure comprising an OCA (Optical Clear Adhesive) 1, a first electrode layer 2, another OCA 3, a second electrode layer 4, and still another OCA 5 on an upper substrate which implements a TFT (thin film transistor) of the liquid crystal panel L. As aforesaid, it is general to secure the strength of a whole product by using six side strengthened glass for a cover lens as a construction material of a window 6. However, as aforesaid, for the six side strengthened glass, after cutting the glass substrate into the cell units, a process for strengthening individually the cut cell units should be performed. That is, a process for strengthening a total of six unit surfaces should be implemented, and thus the problem in that mass production is very decreased is generated.

On the other hand, when the touch screen panel is manufactured in a ledger state using a non-strengthened glass substrate as the window, fracture strength of the window is weak, so the problem that a function as a window cannot be performed is generated.

BRIEF SUMMARY

An aspect of the present invention is to provide an integrated touch screen in which a touch sensor module is integrally implemented with a liquid crystal panel, a substrate of the liquid crystal panel is formed of two side strengthened glass, and the touch sensor module is integrally implemented on the two side strengthened glass, thereby being capable of improving strength of the whole touch sensor module and simplifying a process.

According to an aspect of the present invention, there is provided an integrated touch window including: a touch sensor module formed integrally with a liquid crystal panel including a first substrate and a second substrate on the first substrate, wherein the touch sensor module includes a sensing electrode pattern layer including a patterned sensing electrode formed on the first substrate of two side strengthened glass, and a transparent window formed on the sensing electrode pattern layer.

In accordance with exemplary embodiments of the present invention, the integrated touch window is advantageous that the strength of a whole touch sensor module can be improved and a process can be simplified by integrally implementing the touch sensor module with a liquid crystal panel, forming a substrate of the crystal liquid panel using two side strengthened glass, and implementing the touch sensor module integrally on the two side strengthened glass.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION

Figure 1:
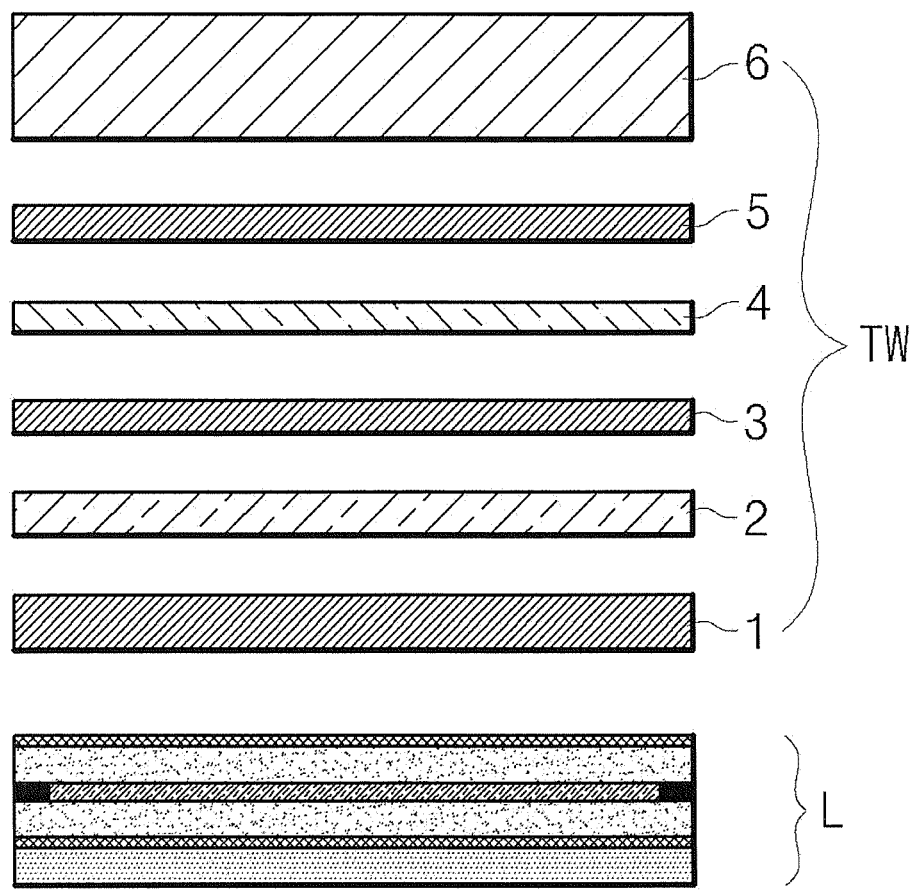
FIG. 1 illustrates a structure of a conventional touch screen panel having an integrated liquid crystal panel according to a prior art.

Exemplary embodiments according to the present invention will now be described more fully hereinafter with reference to the accompanying drawings. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

FIG. 1 is a cross-sectional concept view illustrating the configuration of an integrated touch window according to an exemplary embodiment of the present invention.

Figure 2:
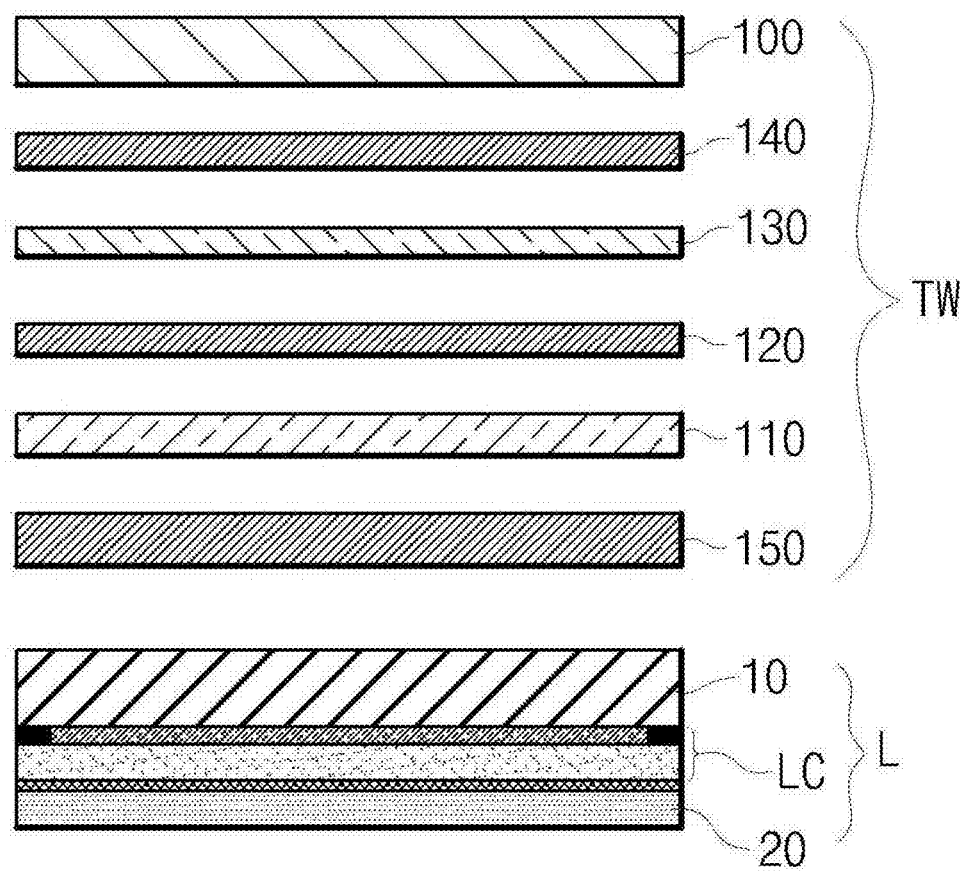
FIG. 2 is a cross-sectional concept view illustrating the configuration of an integrated touch window according to an exemplary embodiment of the present invention.

Referring to FIG. 2, the integrated touch window according to an exemplary embodiment of the present invention may include a touch sensor module TW formed integrally with a liquid crystal panel L including a first substrate 10 and a second substrate 20 on the first substrate 10, wherein the touch sensor module TW includes a sensing electrode pattern layer X including a patterned sensing electrode formed on the first substrate 10 of two side strengthened glass, and a transparent window 100 formed on the sensing electrode pattern layer.

In particular, the integrated touch window according to another exemplary embodiment of the present invention is characterized in that the touch sensor module TW may be integrally bonded onto the first substrate 10 of the liquid crystal panel, and for the first substrate 10 itself, two side strengthened glass other than general glass may be used. Unlike six side strengthened glass basically used for a cover lens of an upper part of the touch panel screen in a conventional art of FIG. 1, the two side strengthened glass can very simplify processes and can improve the strength of an apparatus in such a manner that the process for strengthening one surface and other surface of an original substrate, respectively is performed, and thereafter the process for cutting the substrate into cell units is performed, and the deposition process for forming a bus electrode of an LCD on the cell units is performed.

In particular, since the first substrate of the liquid crystal panel itself may be implemented of the two side strengthened glass, for the transparent window 100 of an uppermost part of the touch sensor module TW, a window of a general substitution material other than the conventional six side strengthened glass can be used, thereby being capable of reducing manufacturing costs and maximizing process efficiency.

The window of the substitution material may be formed of a material such as glass having an excellent light transmission rate, a material having high strength such as an acrylic resin, or PET (polyethylene terephthalate), PC (polycarbonate), PES (polyether sulfone), PI (polyimide), PMMA (Poly-Methly MethaAcrylate) which are applicable to a flexible display unit and the like. The transparent window 100 functions to maintain an external shape of an input part of the touch window, and at least some area thereof is exposed to the outside to thereby receive the touch of a user's body or a conductive object such as a stylus pen.

The two side strengthened glass may basically apply a strengthening technology which has been publicly known. As one example of a process for strengthening two sides, there is a process of immersing a glass substrate in a solution of KNO$_3$ and heating it for 15 to 18 hours at a temperature of 400° C. to 450° C. Through this process, a component of Na existing in a surface of the glass substrate is substituted with a component of K, thereby improving surface strength of the glass substrate. That is, it is characterized in that the component of Na existing in the surface of the transparent substrate which is strengthened is substituted with the component of K, whereby surface strength of the transparent substrate is improved. This can solve the disadvantage of a conventional manufacturing method in that with regard to performing the process for strengthening the window substrate, after cutting the glass substrate into cell units, a process for strengthening individually the cell units is performed, and thereafter the touch screen panel is bonded to the strengthened window substrate, so mass production of the touch screen panel cannot be secured.

Figure 3:
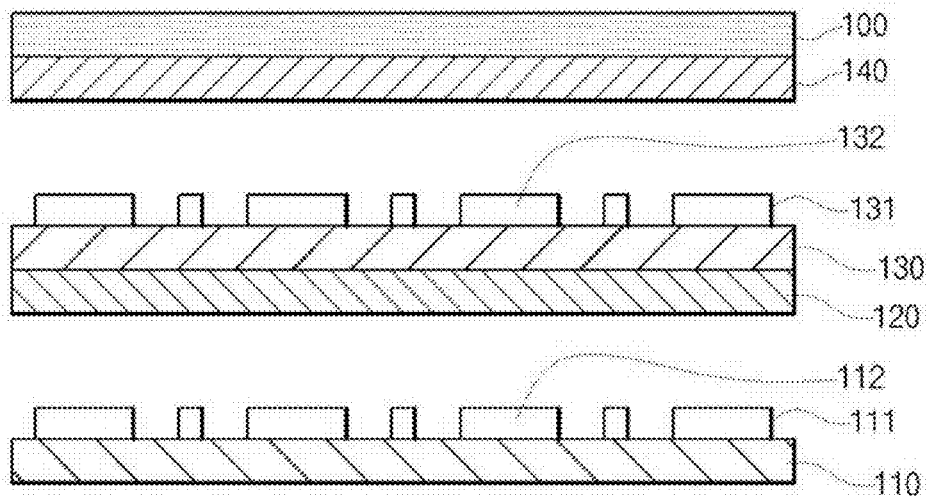
FIG. 3 through FIG. 5 are cross-sectional concept views illustrating other structure of a touch sensor module according to some exemplary embodiments of the present invention.

FIG. 3 illustrates various exemplary embodiments of a touch window TW for an integrated touch window according to the present invention. That is, in the structure of FIG. 2, the structure of the touch window TW according to the present invention formed integrally on the second substrate of the liquid crystal panel L may be modified as follows:

(1) First Exemplary Embodiment

A structure according to this exemplary embodiment is explained with an example which implements in detail the structure of FIG. 2. That is, as illustrated in FIG. 3, a touch sensor module may be formed in the structure including base substrates 130 and 110, and sensing electrodes 132 and 112 patterned on one surface of the base substrate or on other surface opposed to the one surface. That is, the touch sensor module may include: a first sensing electrode pattern layer 130 bonded to the transparent window 100 via a first adhesive material layer 140, and having the sensing electrode pattern 132 on one surface; and a second sensing electrode pattern layer 110 bonded to other surface of the first sensing electrode pattern layer via a second adhesive material layer 120, and having the sensing electrode pattern 112 on one surface. In particular, in this case, the first sensing electrode pattern 132 and the second sensing electrode pattern 112 may be formed on the different base members 130 and 110 from each other, respectively, and thus may be implemented in a structure in which they are spaced apart from each other.

The sensing electrode pattern according to the present invention may be formed of one selected from ITO (Indium Tin Oxide), IZO (Indium Zinc Oxide), ZnO (Zinc Oxide), carbon nano tubes (CNT), Ag Nano wires, conductive polymers, or graphene.

(2) Second Exemplary Embodiment

Figure 4:
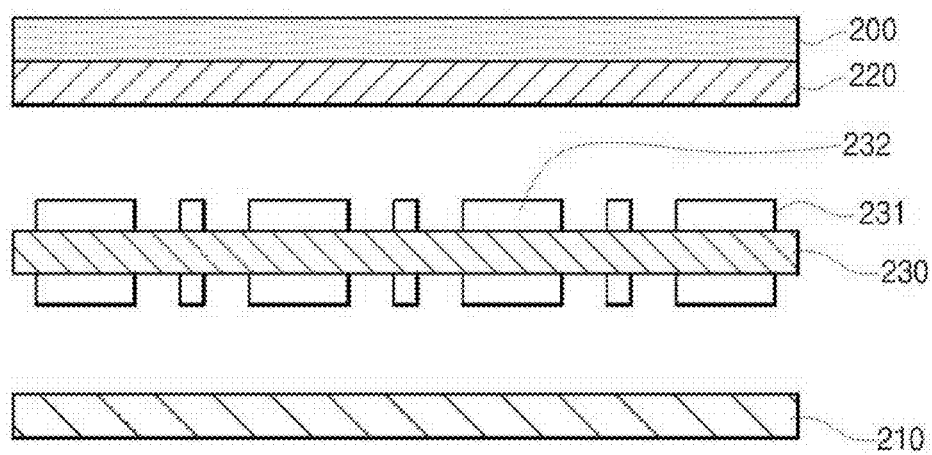

Unlike the structure of FIG. 3, but like the structure of FIG. 4, when implementing the sensor electrode pattern layer, the sensing electrode 232 pattern is formed on both surfaces of the base substrate 230. In view of this, there is a difference between the structures. Moreover, a protective film 210 for protecting the sensing electrode pattern of a lower surface of the base substrate 230 may be further included.

(3) Third Exemplary Embodiment

Figure 5:
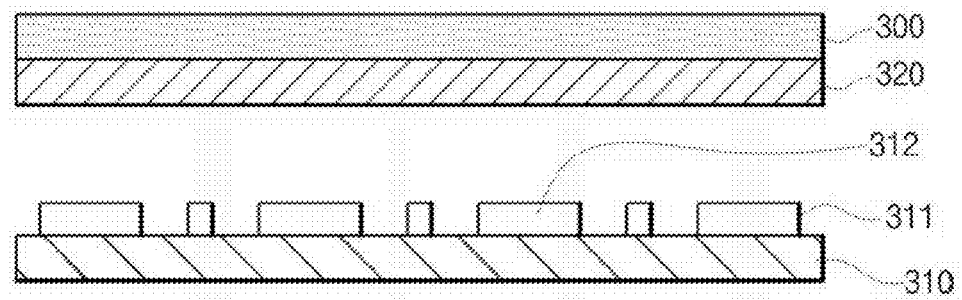

Explaining a structure of the third exemplary embodiment with reference to FIG. 5, FIG. 4 illustrates other structure of the sensing electrode pattern layer according to still another exemplary embodiment of the present invention. That is, a transparent window 300 is formed, a sensing electrode pattern 312 is patterned on a sectional surface of a base substrate 310, and a wiring part 311 is simultaneously formed with the sensing electrode pattern. The first and second sensing electrode patterns are implemented on the same plane as each other. The first sensing electrode layer for determining a first axis (for example, an X axis) component of a contact may be patterned on one surface, and the second sensing electrode layer for determining a second axis (for example, a Y axis) component of a contact may be patterned by implementing a disposition in which the second sensing electrode layer is insulated from the first sensing electrode layer.

Of course, as one example, FIG. 5 shows the configuration in which the sensing electrode pattern layer is formed on the same plane of the separate base substrate 310. Without the base substrate 310, the sensing electrode pattern layer may be formed directly on one surface of the transparent window through a deposition process and a coating process.

(4) Fourth Exemplary Embodiment

The Deformation of a Electrode Pattern

In this exemplary embodiment, an exemplary embodiment which implements other structure through modifications of the sensing electrode pattern of the touch sensor module according to the present invention having the structures as illustrated in FIG. 2 through FIG. 5 is explained.

Figure 6:
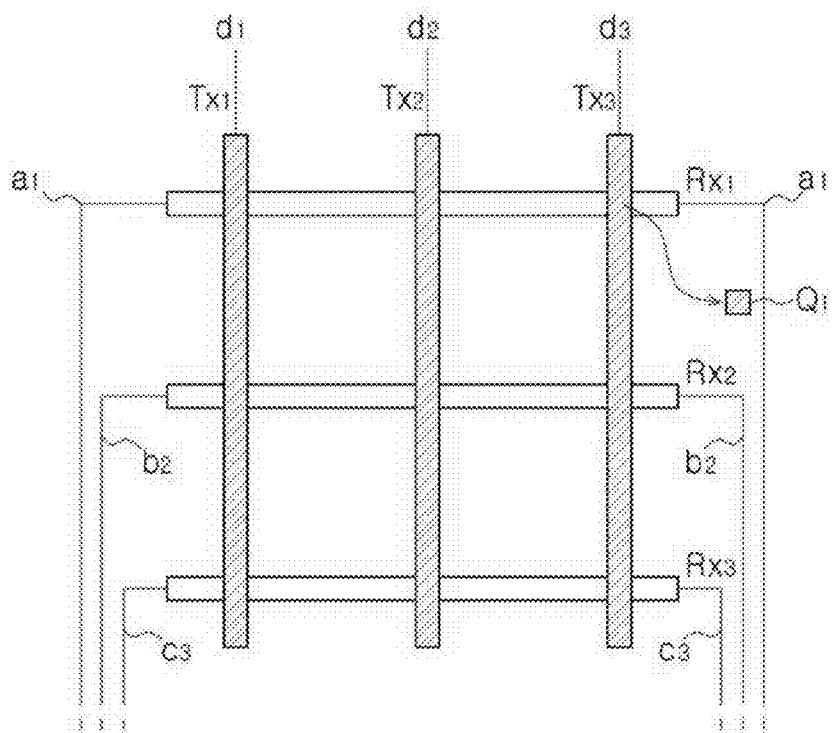
FIG. 6 through FIG. 8 illustrate various modifications of a sensing electrode pattern according to another some exemplary embodiments of the present invention.

Referring to FIG. 6, the second sensing electrode pattern Rx1 formed to be spaced apart from the first sensing electrode pattern Tx1 may be formed in a linear type, and they may be implemented to overlap with each other. In particular, each wiring part is connected to both ends of unit sensing electrode patterns, namely, Rx1, Rx2 and Rx3 consisting of the sensing electrode pattern layer according to the present invention. That is, unit wiring parts a1 and a2 are connected to both ends of the unit sensing electrode pattern Rx1, respectively. Unit wiring parts b1 and b2 are connected to both ends of the unit sensing electrode pattern Rx2, respectively. That is, through this, the structure which has the unit wiring parts connected to both ends of the unit sensing electrode pattern may be provided, so that wirings may be provided to both sides of a sensing area, thereby being capable of reducing the filling time of an electric charge for sensing and improving sensing efficiency. Of course, the structure in which each wiring parts are also connected to both ends of unit sensing electrode patterns, namely, Tx1, Tx2 and Tx3 consisting of the first sensing electrode pattern may be implemented. That is, aforesaid FIG. 6 is a plane view of really implementing a double routing structure in which each wiring part is formed to both ends of the second sensing electrode pattern Rx1, Rx2 and Rx3. This structure is advantageous that the filling time of an electrical charge for sensing can be reduced, and thus sensing efficiency can be improved by providing the unit wiring parts connected to both ends of the unit sensing electrode of the first sensing electrode pattern or the second sensing electrode pattern of the touch window, and thus providing the wirings to both sides of the sensing area.

Figure 7:
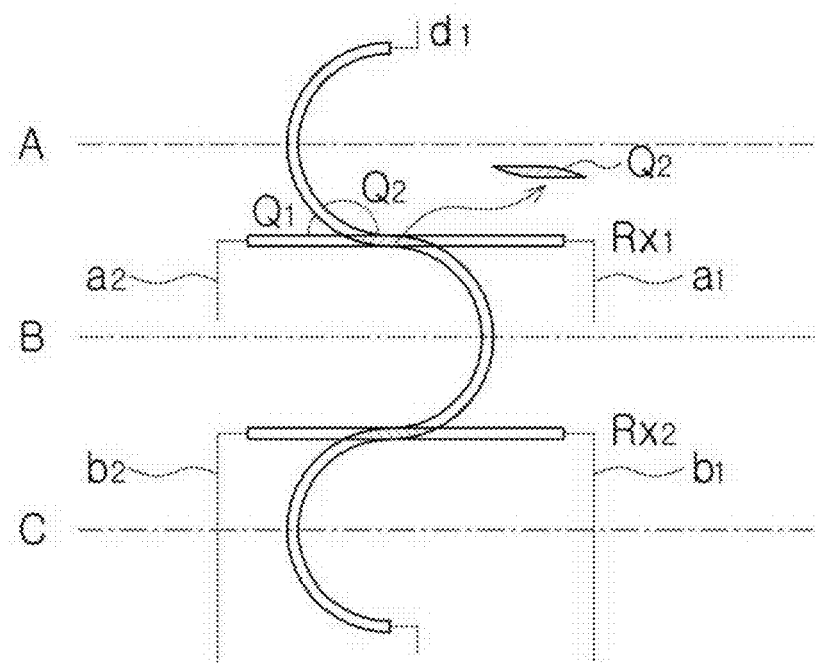

In other words, as illustrated in FIG. 7, in a case where the first and second sensing electrode patterns are implemented to overlap with each other, particularly, one of the sensing electrode patterns may be implemented in a curvature pattern.

That is, the sensing electrode pattern layer according to this exemplary embodiment may be configured such that two sensing electrode pattern layers are disposed to be spaced apart from each other in opposite directions, and at the same time, shapes of the disposed patterns overlap with each other, and one of them may have curvature having fixed periodicity. That is, as illustrated in FIG. 7, the first sensing electrode pattern Tx1 may have a curvature pattern having fixed periodicity, and the second sensor electrode pattern Rx1 formed to be spaced apart from the first sensor electrode pattern Tx1 may be formed in a linear type. That is, in the structure of FIG. 6, the first sensing electrode pattern 132 and the second sensing electrode pattern 112 may be formed in the base substrates 130 and 110 different from each other, respectively to be spaced apart from each other. However, on a plane seen from above, the first sensing electrode pattern 132 has a structure which forms a curvature pattern, and the second sensing electrode pattern 112 is formed in a linear type. Thus, an overlapping area (Q2 of FIG. 7) where they overlap with each other may be formed in a shape other than a rectangular shape or a square shape to be larger than an overlapping area of FIG. 6.

In this invention, the curvature pattern is hereinafter defined as including all patterns which have fixed periodicity, and crest and trough shapes, but which are not a linear type. As illustrated in FIG. 9, a sine type curvature pattern or a cosine type curvature pattern in which the crests and troughs S1, S2 and S3 are periodically repeated may be provided. In addition to this structure, the curvature pattern may be formed in a structure in which zigzag type linear bendings are periodically repeated. Line segments A and B of FIG. 7 are imaginary line segments which pass through the peak of the crests and troughs of each curvature pattern.

In particular, the curvature pattern having periodicity may be formed in a structure in which the sensing electrode pattern in a linear type is disposed between an n curvature part and a (n+1) curvature part. (n represents a natural number of more than 1.) That is, referring to the structure illustrated in FIG. 7, the second sensing electrode pattern Rx1 in a linear type may be disposed between a first curvature part S1 and a second curvature part S2 of the first sensing electrode pattern Tx1. As one example, this exemplary embodiment shows a case that the first sensing electrode pattern is a curvature pattern. However, on the contrary to this, the first sensing electrode pattern may be implemented as a linear pattern and the second sensing electrode pattern may be implemented as a curvature pattern. Moreover, angles $\theta_1$ and $\theta_2$ in which the first sensing electrode pattern Tx1 and the second sensing electrode pattern Rx1 overlap with each other may be formed as an acute angle or an obtuse angle rather than a right angle. Moreover, in a case where the curvature pattern according to the present invention has sine type or cosine type periodicity, the second sensing electrode pattern may pass through and cross a ½ position of the first curvature part and the second curvature part, namely, the position of an inflection point. This disposition structure realizes the effect that touch sensing efficiency can be improved by maximizing a cross area Q2, and visibility can be improved by making optical properties clearer than those of the disposition of a conventional cross structure.

Unlike the aforesaid structure, the wiring parts 111 and 131 for connecting the second and first sensing electrode patterns 112 and 132, respectively may be formed, and the process of simultaneously forming the wiring parts and the sensing electrode patterns using a conductive material such as Ag, Al, and Cu rather than using a transparent electrode material may be used. This can solve the problems in that when the pattern of an electrode is formed using an ITO material, a shape of the pattern is seen, and manufacturing costs increase due to the ITO material that is an expensive material, and in that it would be difficult to realize a structure having a double-sided ITO material layer on a single base substrate due to the degradation in film hardness of the ITO material. Accordingly, it is advantageous that the manufacturing costs can be reduced through the process of simultaneously forming a valid part and the wiring part by forming and patterning the conductive material instead of the ITO material on an optical member, and that the process capable of realizing the freedom of various designs regardless of the degradation in film hardness can be provided.

Figure 8:
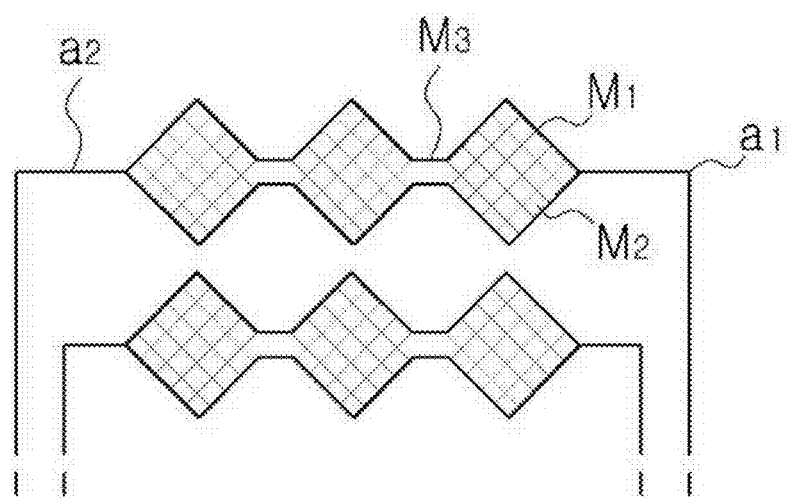

Meanwhile, unlike the aforesaid structure of the electrode pattern of FIG. 7, but like the structure illustrated in FIG. 8, the electrode pattern may be formed in a structure which implements the touch sensor module having a structure formed in a mesh type. That is, it is characterized in that one pattern of the sensing electrode patterns, namely, the unit pattern may be formed in a mesh structure. In this exemplary embodiment, the mesh structure is defined as a structure which includes an external line pattern M1 for forming an exterior angle part of the unit pattern and an internal line pattern M2 for connecting an inside of the external line pattern in a cross structure. In particular, the external line pattern M1 may be implemented in various shapes such as a circular shape and an elliptical shape as well as a polygonal shape and may be formed of a conductive material in a line shape.

Furthermore, as illustrated, the internal line pattern M2 may be formed by the collection of lines for connecting the inside of the external line pattern M1 in a cross structure. That is, the number of patterns having a linear structure may be formed in a net structure to cross each other. Of course, the disposition of various curved-line structures as well as a straight-line structure may be also applied. The sensing electrode of the mesh structure according to the present invention may transmit an electrical signal by forming the lines continued by a conductive material of 3 μm~10 μm in a polygonal mesh shape.

In the case, signal transmission efficiency can be largely increased by controlling a line width and a cross angle in the cross structure of the internal pattern line M2 in the mesh structure. Moreover, the process of simultaneously producing the wiring part and the sensing electrode pattern with the same material as each other may be implemented, thereby being capable of increasing process efficiency. In addition, because the ITO material is not used, a process cost can be largely reduced. Accordingly, the signal transmission efficiency resulting from the reduction of a material cost and a process cost may be improved by the mesh structure, thereby being capable of realizing a product having high efficiency. Various materials such as Ag, Cu, and Al may be applied to the conductive material used for the wirings and the sensing electrodes used in the present invention. That is, in the case of the structure of FIG. 8, an electrode is not formed using a transparent electrode material, and with regard to the wiring parts 111 and 131 for connecting the second and first sensing electrode patterns 112 and 132, respectively, the process of simultaneously forming the wiring parts and the sensing electrode patterns using the conductive material such as Ag, Al and Cu may be used.

This can solve the problems in that when a pattern of the electrode is formed using an ITO material, a shape of the pattern is seen and a production cost increases due to the ITO material that is an expensive material, and in that it would be difficult to realize a structure which has a double-sided ITO material layer on both surfaces of the single base substrate due to the degradation in film hardness of the ITO material. Thus, it is advantageous that the production cost can be reduced through the process of simultaneously forming the valid part and the wiring part by forming and patterning the conductive material instead of the ITO material on the optical member, and that the process capable of realizing the freedom of various designs regardless of the degradation in film hardness can be provided.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A touch window, comprising:
   a sensing electrode pattern layer including a first sensing electrode pattern, a base substrate, and a second sensing electrode pattern; and
   a transparent window formed on the sensing electrode pattern layer,
   wherein the transparent window is disposed at a first side of the sensing electrode pattern layer,
   wherein the first sensing electrode pattern is formed on a first surface of the base substrate and the second sensing electrode pattern is formed on a second surface of the base substrate opposite to the first surface,
   wherein the sensing electrode pattern layer is bonded to the transparent window by an adhesive layer,
   wherein unit sensing electrodes of the sensing electrode pattern layer are formed in a mesh structure, the mesh structure including an internal line,
   wherein one of the first sensing electrode pattern and the second sensing electrode pattern has a curvature pattern with periodicity, and
   wherein the curvature pattern with periodicity is configured such that the sensing electrode pattern in a linear type is disposed between an n curvature part and an (n+1) curvature part, wherein n represents a natural number greater than 1.

2. The touch window of claim 1, wherein the transparent window uses one among glass, acrylic resins, PET (polyethylene terephthalate), PC (polycarbonate), PES (polyether sulfone), PI (polyimide), and PMMA (polymethylmethacrylate).

3. The touch window of claim 1, wherein the sensing electrode is formed of one selected from ITO (Indium Tin Oxide), IZO (Indium Zinc Oxide), ZnO (Zinc Oxide), CNT (carbon nano tube), Ag Nano wires, conductive polymers, Graphene, Ag, Cu, or Al.

4. The touch window of claim 3, wherein the first sensing electrode pattern and the second sensing electrode pattern of the sensing electrode pattern layer are formed of the same material as a wiring part.

5. The touch window of claim 1, wherein the curvature pattern is the first sensing electrode pattern.

6. The touch window of claim 1, wherein an angle θ in which the first sensing electrode pattern and the second sensing electrode pattern overlap with each other is formed as an acute angle or an obtuse angle.

7. The touch window of claim 1, wherein the curvature pattern is a sine pattern or a cosine pattern, and the second sensing electrode pattern passes through an inflection point of the n curvature part and the (n+1) curvature part.

8. The touch window of claim 1, wherein the mesh structure comprises lines connected by a conductive material having a width of from 3 μm to 10 μm.

9. The touch window of claim 1, further comprising a panel disposed at a second side of the sensing electrode pattern layer opposite to the first side of the sensing electrode pattern layer.

10. The touch window of claim 9, wherein the panel is a liquid crystal panel.

* * * * *